United States Patent [19]

Ohshima

[11] Patent Number: 6,094,229
[45] Date of Patent: *Jul. 25, 2000

[54] IF SIGNAL PROCESSING CIRCUIT FOR VIDEO SIGNAL AND SOUND SYSTEM FORM IN ONE INTEGRATED CIRCUIT

[75] Inventor: Tadaaki Ohshima, Saitama-ken, Japan

[73] Assignee: Kabushiki Kaisha Toshiba, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/777,961

[22] Filed: Dec. 24, 1996

[30] Foreign Application Priority Data

Dec. 26, 1995 [JP] Japan ..................... 7-339241

[51] Int. Cl.$^7$ ................. H04N 5/44; H04N 5/46
[52] U.S. Cl. .................. 348/555; 348/736; 348/554
[58] Field of Search ..................... 348/736, 737, 348/738, 726, 554, 555, 558, 553; 455/303, 307, 188.1, 179.1; H04N 5/44, 5/46

[56] References Cited

U.S. PATENT DOCUMENTS 4,511,924   4/1985   Griffis ........................... 348/737
5,355,162  10/1994   Yazolino ......................... 348/11

FOREIGN PATENT DOCUMENTS 5-48990   2/1993   Japan .

*Primary Examiner*—Mark R. Powell
*Assistant Examiner*—Wesner Sajous
*Attorney, Agent, or Firm*—Pillsbury Madison & Sutro LLP

[57] ABSTRACT

The following means are integrated in one IF IC: the switching part 60 in the video signal passage for changing over a plurality of sound trap circuits and equalizing circuits 61–64; the switching part 66 in the sound signal passage for changing over a plurality of band-pass filters 67–70 to pass the intercarrier signals of different frequencies; the switching parts (77A, 77B, 78) for adjusting the gains to regulate the difference of sound signal level caused by different frequency modulation degree of each broadcasting system to the constant level and for changing over deemphasis time constant. In addition, the same IF IC contains the FM demodulating circuit 80 of PLL system to demodulate the sound intercarrier and the controller 81 for controlling the changeover of switching parts 60, 66, 78. As a result, the IF IC of very high integration density has been achieved, and the number of components of IF signal processing circuit can be decreased.

4 Claims, 5 Drawing Sheets

FIG.4

MODE LOGIC

| SW1 | SW2 | SIF | EQ IN | GAIN/DEEMPHASIS TIME CONSTANT | SYSTEM |
|-----|-----|--------|------|------------------------------|--------|
| L | L | 4.5MHz | NTSC | 6dB, 75µs | M |
| L | H | 5.5MHz | PAL | 0dB, 50µs | B/G |
| H | L | 6.0MHz | PAL | 0dB, 50µs | I |
| H | H | 6.5MHz | PAL | 0dB, 50µs | D/K |

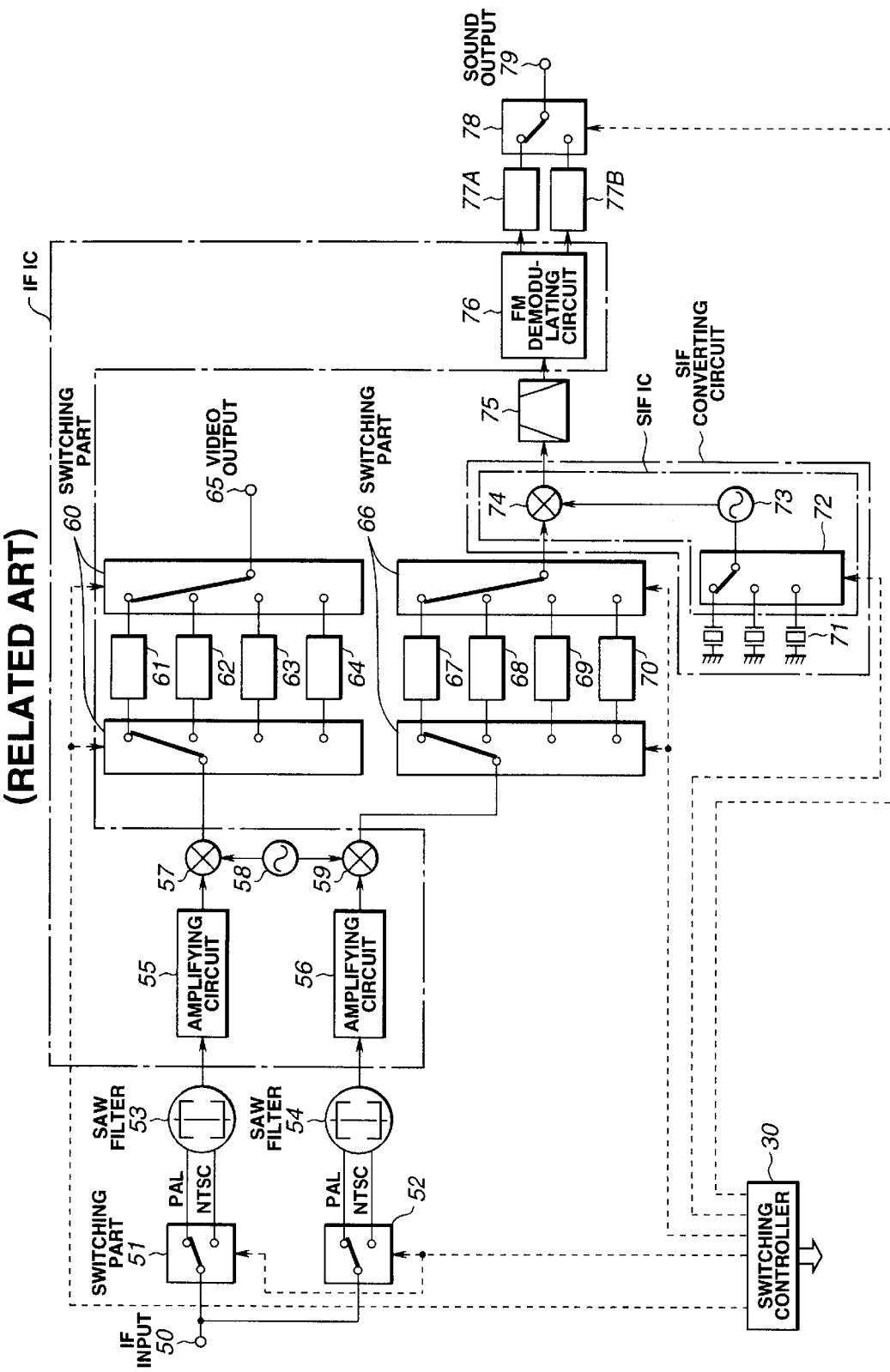

IF SIGNAL PROCESSING CIRCUIT FOR VIDEO SIGNAL AND SOUND SYSTEM FORM IN ONE INTEGRATED CIRCUIT

TITLE OF THE INVENTION

IF signal processing circuit for video signal and sound system form in one integrated circuit.

BACKGROUND OF THE INVENTION

1. Field of the Invention

The present invention relates to an IF signal processing circuit formed in a semiconductor device in which many IF signal processing functions are integrated and the number of circuit components is reduced.

2. Description of the Related Art

A multisystem television receiver (hereinafter called a multivision receiver) which can receive a plurality of television broadcasting signals of different broadcasting systems has not been developed until recently.

Generally, there are various standards for a broadcasting system. For example, the TV broadcasting is classified into PAL system, SECAM system and NTSC system according to its color broadcasting system. The TV broadcasting is also classified into M system, B/G system, I system, D/K system, etc. according to its differences of carrier frequency and video signals. To receive the signals of a plurality of broadcasting systems in various countries all over the world, it is necessary for the processing circuit for intermediate frequency (hereinafter called IF) of the multivision receiver to process a video signal and a sound signal in accordance with an intercarrier frequency which is the difference between a video carrier frequency and a sound carrier frequency.

Especially, when a video signal subjected to amplitude modulation of negative polarity is processed in an IF signal processing circuit, it is possible to demodulate the TV signals of various broadcasting systems in a similar demodulating circuit, even though they are different in intercarrier frequency, frequency modulation degree (frequency deviation) and deemphasis time constant. Therefore, the multivision receiver which can demodulate TV signals of various broadcasting systems is now on the market.

The intercarrier frequency for the M system is 4.5 MHz, for the B/G system 5.5 MHz, for the I system 6.0 MHz, for the D/K system 6.5 MHz.

It is well known that since the frequency-modulated sound wave rides on the intercarrier frequency wave, the sound signal can be obtained by detecting the frequency-modulated signal on the intercarrier frequency.

Some multivision receivers have an auto mode function which can automatically determine the broadcasting system of input TV signal and can receive such signal without manual operation by the user.

When a general-purpose IF processing semiconductor device (hereinafter called IF IC) is used for the IF signal processing circuit of the multivision receiver which can receive TV signals of various broadcasting systems, it is typical to install a band-pass filter, a trap circuit, etc. (as external components) in the peripheral circuit of IC and to change over them by an external switching circuit.

In addition, (as external components), a sound amplifying circuit according to frequency modulation degree, deemphasis circuit according to preemphasis time constant, etc. are also installed in the IC peripheral circuit. These circuits are also changed over with the external switching circuit to demodulate the sound signal. It is typical to constitute such a peripheral circuit with a discrete component, etc.

FIG. 5 shows the block diagram of the conventional IF signal processing circuit.

In the FIG. 5, a tuner is omitted. The RF signals of various broadcasting systems are applied to such tuner (not shown). The tuner obtains an IF signal from the signal of predetermined channel of such RF signal and feeds it to the input terminal 50. The IF IC is shown in the dashed line frame. In this example, it is assumed that the signal of the NTSC or PAL system is applied to the input terminal 50.

The IF signal applied to the input terminal 50 is fed to a SAW filter 53 through the switching part 51 on the video signal side. The SAW filter 53 is a video band filter using the surface acoustic wave. The SAW filter 53 contains two filters having different signal bands in a single casing. The SAW filter 53 passes the video band signal of the IF signal of the NTSC or PAL system, but blocks any signal of other bands. The switching part 51 provided prior to the SAW filter 53 can be changed over according to the NTSC or PAL broadcasting system.

Similarly, on the sound signal side, the IF signal from the input terminal 50 is fed to the SAW filter 54 through the switching part 52. The SAW filter 54 also contains two filters with different signal bands in a single casing. The SAW filter 54 passes the sound band signal of the IF signal of the NTSC or PAL system, but blocks any signal of other bands.

The IF signal of the video band coming from the SAW filter 53 on the video signal side is amplified to a signal with sufficient amplitude at the amplifying circuit 55. Then the resulting signal is video-detected in the multiplying circuit 57. To the multiplying circuit 57, both video IF signal from the amplifying circuit 55 and the oscillation signal (having the same frequency as the video IF frequency) from the oscillator 58 are supplied. Both signals are multiplied with each other for synchronous detection and the base band video signal is obtained.

The IF signal of the sound band coming from the SAW filter 54 on the sound signal side is amplified to a signal with sufficient amplitude in the amplifying circuit 56. Then the resulting signal is intercarrier-demodulated in the multiplying circuit 59. To the multiplying circuit 59, both sound IF signal from the amplifying circuit 56 and oscillation signal (having the same frequency as the video IF frequency) from the oscillator 58 are supplied. Both signals are multiplied with each other, then the sound intercarrier signal is obtained as the difference between the oscillation signal and the sound IF signal. This is the frequency-modulated signal superimposed with the sound wave.

The outputs from these multiplying circuits 57, 59 are respectively fed to the video signal processing units (60–65) and to the sound signal processing units (66–74).

The video signal processing units (60–65) are equipped with a switching part 60 for the changeover according to each broadcasting system and the sound trap circuits and the equalizing circuits (61–64) of the characteristics corresponding to each broadcasting system. The purposes of such circuits are to remove the sound signal (unnecessary sound beat) of the different intercarrier of each broadcasting system and to achieve the same frequency characteristics (frequency-amplitude characteristics and frequency-phase characteristics) with respect to the different video signal frequency characteristics according to each broadcasting system. As shown in FIG. 5, the switching part 60 is installed both on the input and output sides of the sound trap circuits and the equalizing circuit (61–64). The switching parts 60 on both input and output sides are synchronously controlled by the switching controller 30. In the sound trap circuits contained in the sound trap circuits and the equalizing circuits (61–64), the sound trap frequency is changed over by the switching part 60 according to each broadcasting system (B/G, I and D/K of the PAL system and M of the NTSC system). The purpose of such sound trap circuits is to remove unnecessary sound beat (that is, sound intercarrier signal) in the video detection output from the multiplying circuit 57, caused by the sound IF signal which was not removed by the SAW filter 53. In the equalizing circuits contained in the sound trap circuits and equalizing circuits (61–64), the frequency-amplitude characteristics and the frequency-phase characteristics (group delay characteristics) of the video signal can be changed over by the switching part 60 according to each broadcasting system (B/G, I and D/K of the PAL system and M of the NTSC system). The purpose of such equalizing circuits is to achieve the same frequency-amplitude characteristics and the same frequency-phase characteristics (group delay characteristics) with respect to the different video signal frequency characteristics according to each broadcasting system. The video output signal is obtained at a terminal 65.

The sound signal processing units (66–74) are equipped with band-pass filters (67–70) corresponding to the intercarrier frequency of each broadcasting system. These band-pass filters (67–70) are changed over by the switching part 66 according to each broadcasting system. These band-pass filters (67–70) also feed only the signal within the intercarrier frequency band of each broadcasting system to the posterior SIF converting circuits (71–74). The frequency of the signal which passed through one of the band-pass filters (67–70) is converted by the SIF converting circuits (71–74).

These SIF converting circuit (71–74) is required, because the posterior FM demodulating circuit 76 of the quadrature type can detect the frequency-modulated signal of the single frequency alone. The purpose of such SIF converting circuits (71–74) is to keep the frequency of the output signal whose frequency was converted by the multiplying circuit 74 always constant by changing the oscillation frequency of the oscillator 73 (by changing over the crystals 71) according to the broadcasting system, even though the sound intercarrier signal frequency passing through the band-pass filters (67–70) corresponding to each broadcasting system is different according to the broadcasting system. The FM demodulating circuit 76 of quadrature type is the conventional typical circuit for this purpose.

The SIF converting circuit (71–74) comprises a multiplying circuit 74, an oscillator 73, a switching circuit 72 and a plurality (three in the figure) of crystals 71. However, in the SIF converting circuit, the multiplying circuit 74, the oscillator 73 and the switching circuit 72 are formed in an integrated circuit, excluding the crystals 71. In this case, a plurality of the crystals 71 alone are external components. To change over the oscillation frequency according to each broadcasting system, the oscillator 73 is equipped with the switching circuit 72 to change over a plurality (three in the figure) of crystals 71 as required.

The output signal from the SIF converting circuit (71–74) is fed to the FM demodulating circuit 76 through the band-pass filter 75 to demodulate the frequency-modulated sound signal.

To reproduce the sound signal according to the frequency modulation degree (frequency deviation) and preemphasis degree given to it on the transmission side in accordance with each broadcasting system, such sound signal is processed by the amplifying circuits and the deemphasis circuits 77A, 77B to be output from the output terminal 79.

In the above description, the amplifying circuits and the deemphasizing circuits 77A, 77B are for the NTSC and the PAL systems. These circuits 77A, 77B are set to the gain and the deemphasis level according to the NTSC and the PAL systems. The amplifying circuits and the deemphasizing circuits 77A, 77B are changed over by the switching circuit 78 installed on the output side according to the NTSC and the PAL systems. The switching circuit 78 is also changed over according to the control signal from the switching controller 30.

The frequency modulation degree of the NTSC (M) system is ±25 kHz, but such degree of the PAL (B/G, I and D/K) system is ±50 kHz. Therefore, the output level of the frequency-demodulated sound signal of the NTSC system is lower than that of the PAL system by 6 dB. It is necessary to compensate for such level down. For such purpose, the gain of each amplifying circuit contained in the amplifying circuits and the deemphasizing circuits 77A, 77B is changed over according to the NTSC and the PAL systems.

The preemphasis degree of the NTSC (M) system is 75 µs, but that of the PAL (B/G, I and D/K) system is 50 µs. Therefore, in the deemphasis circuit contained in the amplifying circuits and the deemphasizing circuits 77A, 77B, two deemphasis time constants are changed over for the frequency-demodulated sound signal according to the difference in the preemphasis of the NTSC and the PAL systems.

However, in the above-mentioned configuration, a lot of changeover switches are required for the changeover of various components according to each broadcasting system. Furthermore, in addition to the IF IC, other components such as and filters, switches, SIF converting circuits are required as the peripheral circuits. As a result, various problems such as increase in the number of components used, the number of assembly steps, and the circuit size occur.

SUMMARY OF THE INVENTION

The purpose of the present invention is to provide an IF signal processing circuit which can decrease the number of components in the configuration of a circuit being capable of receiving broadcasting signals with different intercarriers.

Another purpose of the present invention is to provide an IF signal processing circuit with functions integrated as much as possible with minimal peripheral components.

The present invention is an IF signal processing circuit which can process a plurality of IF frequencies according to broadcasting system. Such circuit is characterized in that the following means are formed in a single semiconductor device. They are demodulating means including means in a video signal passage for detecting video signal, and means in the sound signal passage for demodulating the sound signal; switching means including means for switching the video signal processing means for the detected video signal from said demodulating means according to broadcasting system, and the means for switching the sound signal processing means according to broadcasting system in the process of demodulating the sound signal by said demodulating means; means for adjusting the amplitude of the sound signal demodulated by said demodulating means according to broadcasting system; and means for controlling the changeover of said switching means and said adjusting means according to broadcasting system.

The sound demodulating means in the above-mentioned demodulating means in the present invention comprises a first means for demodulating the sound intercarrier signal from the sound IF signal; and a second means for PLL FM-demodulating the sound intercarrier signal processed according to broadcasting system after the sound intercarrier demodulation.

The improvement of the present invention is to adopt PLL so that the sound demodulating means can respond to the intercarrier frequency of each broadcasting system. Therefore, the demodulating circuit can be formed without using a crystal switching circuit, etc. with less wiring. That is, the present invention provides an IF IC which can be easily assembled.

The above-mentioned switching means in the present invention comprises a first switching part, which is provided in the sound signal passage, for selecting a plurality of band-pass filters corresponding to the intercarrier frequency of each broadcasting system according to the signal applied to the control terminal; a second switching part, which is provided in the video signal passage, for switching at least a plurality of sound trap circuits according to the signal applied to the control terminal in order to remove the sound signal of the intercarrier frequency of each broadcasting system.

In addition, in the present invention, a plurarity of amplifying circuits with different gains and a plurality of deemphasizing circuits are installed to reproduce the sound signal according to each broadcasting system.

The above-mentioned adjusting means comprises a plurality of amplifying circuits with gains according to each broadcasting system to achieve the constant sound signal level; a plurality of deemphasizing circuits to deemphasize the signal according to preemphasis given on the transmission side; and the third switching part with the control terminal for selecting the above-mentioned amplifying circuits and the deemphasizing circuits according to each broadcasting system.

With the decrease of the circuit components, the numbers of the switching parts and wiring also decrease, so a compact IF signal processing circuit can be achieved.

BRIEF DESCRIPTION OF THE DRAWINGS

FIG. 4 shows the setting of the mode switch shown in FIG. 1.

FIG. 5 shows the configuration of the conventional IF signal processing circuit.

DETAILED DESCRIPTION OF THE PREFERRED EMBODIMENTS

Various embodiment of the present invention will be described with reference to the drawings.

Figure 1:
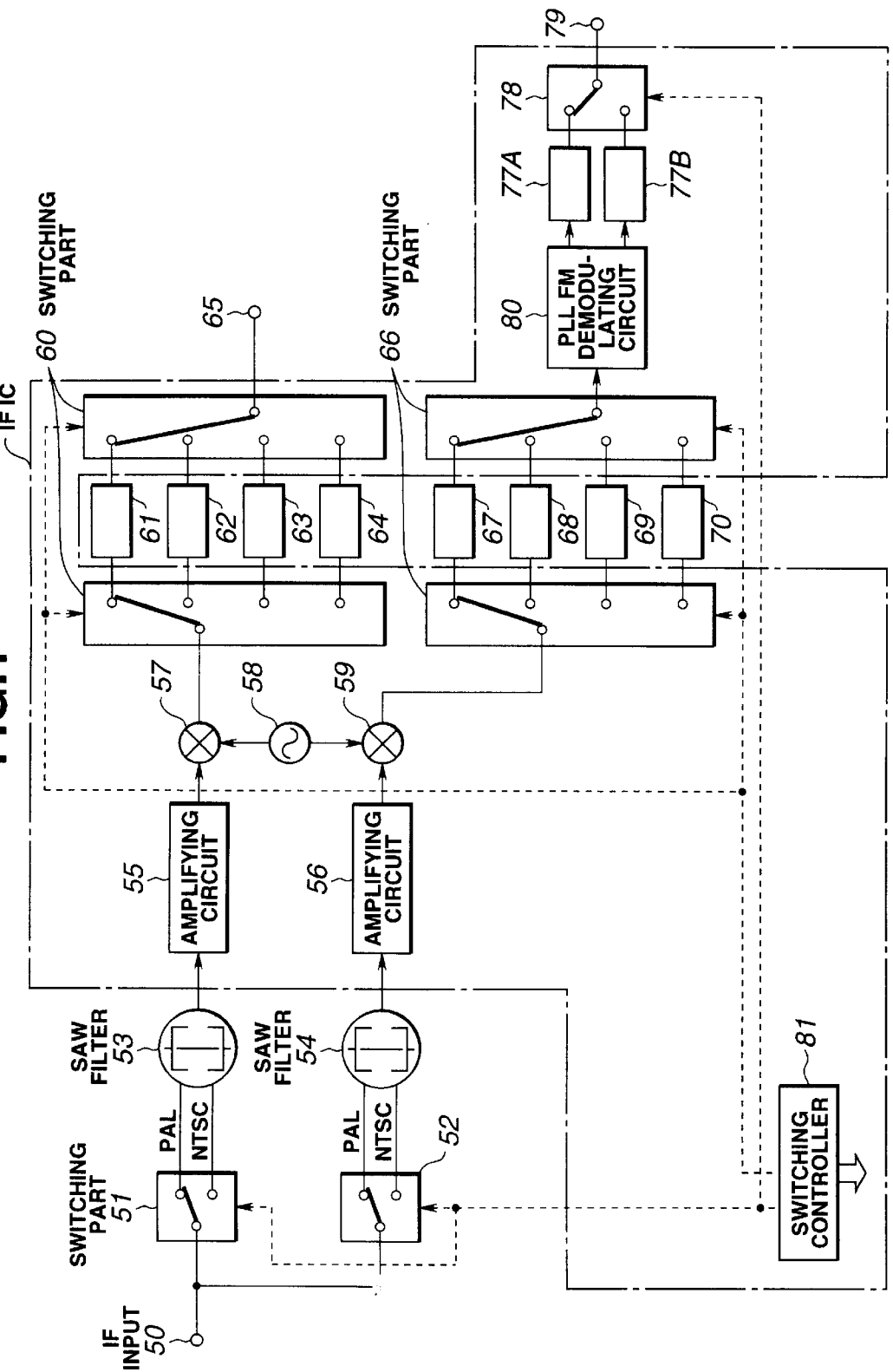
FIG. 1 shows one embodiment of the configuration of an IF signal processing circuit according to the present invention.

FIG. 1 is a block diagram of the configuration of the principal sections of the IF signal processing circuit of one embodiment of the present invention.

The SIF converting circuit (71–74) in FIG. 5 is removed and the FM demodulating circuit 80 of PLL system is employed instead of it. The switching controller 81 for controlling the changeover of the switching parts 60, 66, and 78 is incorporated in the IF IC. At the same time, all the components excluding the filter parts (61–64, 67–70) of the rear stage of the SAW filters are included in the IF IC (in the dashed line frame in FIG. 1). That is, the peripheral circuit is limited to only the sound trap circuit and the equalizing circuits (61–64), the band-pass filters (67–70), the input stage switching parts 51, 52 and the SAW filters 53, 54.

In FIG. 1, the RF signal of each broadcasting system is applied to a tuner (not shown). The tuner obtains the IF signal from the signal of the predetermined channel of the RF signal and feeds such IF signal to the input terminal 50. The IF IC is shown in the dashed line frame. In this figure, it is assumed that the signal of the NTSC or the PAL system is applied to the input terminal 50.

The IF signal applied to the input terminal 50 is fed to the SAW filter 53 through the switching part 51 on the video signal side. The SAW filter 53 is a video band filter using the surface acoustic wave. The SAW filter 53 contains two filters having different signal bands in a single casing. The SAW filter 53 passes the signal in the video band of the IF signal of the NTSC or PAL system, and blocks any signal of other bands. The switching part 51 provided prior to the SAW filter 53 can be changed over according to each broadcasting system, NTSC and PAL systems in this case.

Similarly, on the sound signal side, the IF signal from the input terminal 50 is fed to the SAW filter 54 through the switching part 52. The SAW filter 54 also contains two filters having different signal bands in a single casing. The SAW filter 54 passes the signal in the sound band of the IF signal of the NTSC or PAL system, and blocks any signal of other frequencies.

The IF signal in the video band from the SAW filters 53 on the video signal side is amplified to a signal with sufficient amplitude at the amplifying circuit 55 and then the resulting signal is video-detected by the multiplying circuit 57. To the multiplying circuit 57, both video IF signal from the amplifying circuit 55 and the oscillation signal (having the same frequency as the video IF frequency) from the oscillator 58 are applied. Both signals are multiplied with each other for synchronous detection to obtain the base band video signal.

The IF signal in the sound band from the SAW filters 54 on the sound signal side is amplified to a signal with sufficient amplitude in the amplifying circuit 56 and then the resulting signal is intercarrier-demodulated by the multiplying circuit 59. To the multiplying circuit 59, both sound IF signal from the amplifying circuit 56 and oscillation signal (having the same frequency as the video IF frequency) from the oscillator 58 are applied. Both signals are multiplied with each other to obtain the sound intercarrier signal as the difference between the oscillation signal and the sound IF signal. This is the frequency-modulated signal superimposed with the sound wave.

The outputs from these multiplying circuits 57, 59 are respectively fed to the video signal processing circuits (60–65) and the sound signal processing circuits (66–70).

The video signal processing circuits (60–65) are equipped with a switching part 60 for the changeover according to each broadcasting system and the sound trap circuits and the equalizing circuits (61–64) of the characteristics correspoding to each broadcasting system. The purpose of such circuits is to remove the sound signal (unnecessary sound beat) of the different intercarrier frequency of each broadcasting system and to achieve the same frequency characteristics (frequency-amplitude characteristics and frequency-phase characteristics) with respect to the different video signal frequency characteristics according to each broadcasting system. In FIG. 1, the switching part 60 is installed on both input side and output side of these sound trap circuits and the equalizing circuits (61–64). These switching parts 60 on both input side and output side are synchronously switched by the switching controller 81. In the sound trap circuits contained in the sound trap circuits and the equalizing circuits (61–64), the sound trap frequency is changed over by the switching part 60 according to each broadcasting system (B/G, I and D/K of the PAL system and M of the NTSC system). In the equalizing circuits contained in the sound trap circuits and equalizing circuits (61–64), the frequency-amplitude characteristics and the frequency-phase characteristics (group delay characteristics) of the video signal can be changed over by the switching part 60 according to each broadcasting system (B/G, I and D/K of the PAL system and M of the NTSC system). The purpose of such equalizing circuits is to achieve the same frequency-amplitude characteristics and the same frequency-phase characteristics (group delay characteristics) with respect to the different video signal frequency characteristics according to each broadcasting system. The video output signal is obtained at the terminal 65.

The sound signal processing units (66–70) are equipped with the band-pass filters (67–70) corresponding to the intercarrier frequency of each broadcasting system. These band–pass filters (67–70) are changed over by the switching part 66 according to each broadcasting system. These band-pass filters (67–70) feed only the signal within the intercarrier frequency band of each broadcasting system to the posterior demodulating circuit 80 of PLL system.

Figure 2:
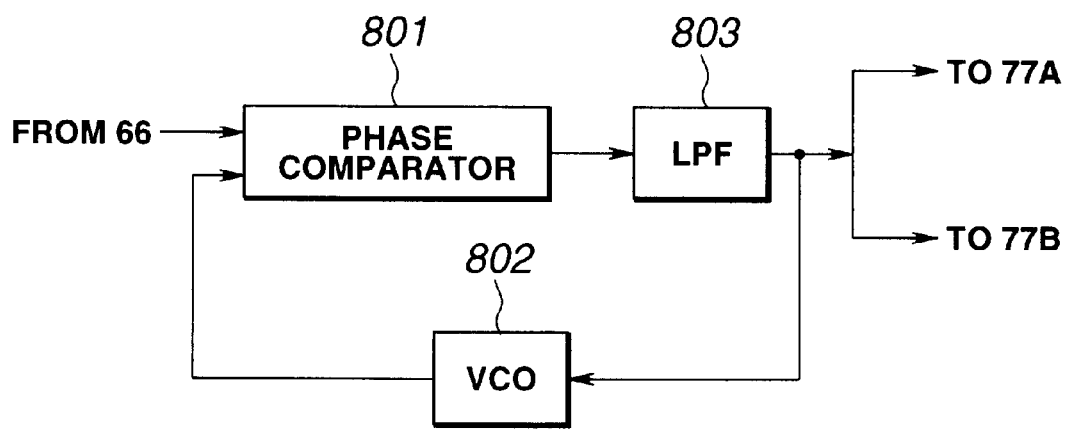
FIG. 2 shows a block diagram of the configuration of the PLL demodulating circuit of FIG. 1.

As shown in FIG. 2, the demodulating circuit 80 of PLL system consists of the phase comparator 801, the voltage controlled oscillator (VCO) 802 and the low-pass filter (LPF) 803. The frequency-modulated sound intercarrier signal is applied to one input terminal of the phase comparator 801, and the oscillation signal is applied to its other input terminal from the voltage controlled oscillator (VCO). The phase comparator 801 outputs comparison signal corresponding to the phase difference (that is, frequency difference ) between both signals. The purpose of the low-pass filter 803 is to remove high frequency noise and unnecessary interference signals contained in the comparison output (which changes in proportion to the frequency change of the frequency-modulated signal) from the phase comparator 801. The output of the low-pass filter 803 is applied to the voltage controlled oscillator 802 as the control voltage, and at the same time to the posterior amplifying circuits and deemphasizing circuits 77A, 77B as the demodulated signal.

The FM demodulating circuit 80 of the PLL system can demodulate the frequency-modulated signals of each broadcasting system, because the PLL loop can follow the frequency change of the applied intercarrier signal to 4.5, 5.5, 6.0 and 6.5 MHz.

To reproduce the sound signal according to the frequency modulation degree (frequency deviation) and preemphasis degree given to it on the transmission side according to each broadcasting system, such sound signal is processed by the amplifying circuits and the deemphasizing circuits 77A, 77B to be output from the output terminal 79.

In the above description, the amplifying circuits and the deemphasizing circuits 77A, 77B are for the NTSC and the PAL systems. These circuits are set to the gains and the deemphasis levels according to the NTSC and the PAL systems. The amplifying circuits and the deemphasizing circuits 77A, 77B are changed over by the switching circuit 78 installed on the output side according to the NTSC and the PAL systems. The switching circuit 78 is also changed over according to the control signal from the switching controller 81.

The frequency modulation degree of the NTSC (M) system is ±25 kHz, but such degree of the PAL (B/G, I, D/K) system is ±50 kHz. Therefore, the output level of the frequency-demodulated sound signal of the NTSC system is lower than that of the PAL system by 6dB. It is necessary to compensate for disparity in signal levels. For such purpose, the gain of each amplifying circuit contained in the amplifying circuits and the deemphasizing circuits 77A, 77B is changed over according to the NTSC and the PAL systems.

The preemphasis degree of the NTSC (M) system is 75 $\mu$s, but that of the PAL (B/G, I and D/K) system is 50 $\mu$s. Therefore, in the deemphasizing circuits in the amplifying circuits and the deemphasizing circuits 77A, 77B, two deemphasis time constants are changed over for the frequency-demodulated sound signal according to the difference in the preemphasis degrees of the NTSC and the PAL systems.

The IF IC having the above-mentioned circuit configuration will be described below.

Figure 3:
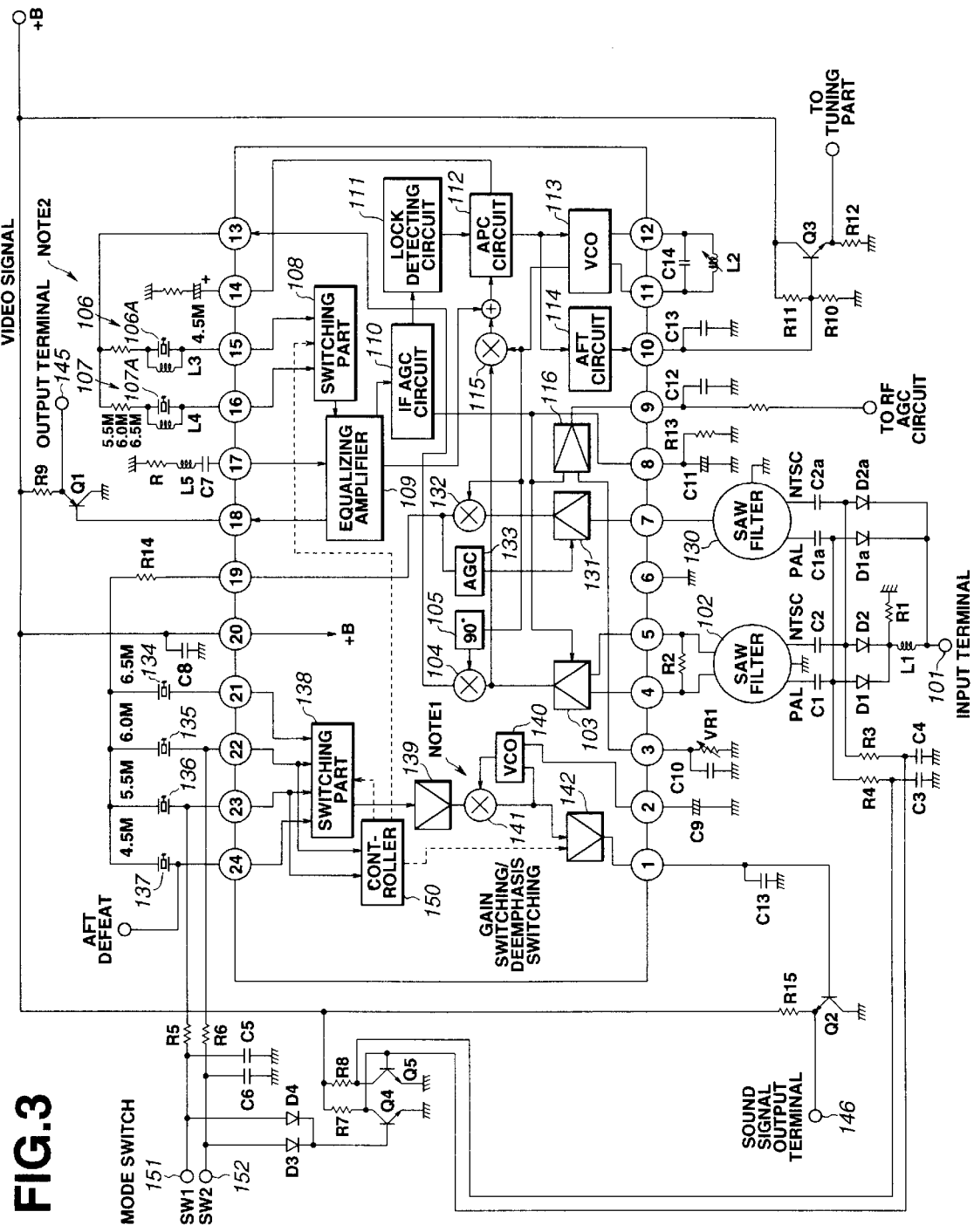
FIG. 3 shows the actual example of the circuit shown in FIG. 1.

FIG. 3 shows a circuit diagram in and around the IF IC. The reference number in the circle is the input/output pin number of the IF IC.

The demodulating circuit (140, 141) of PLL system (the NOTE1 section in FIG. 3) is the sound demodulating circuit. The IF IC of the present invention is characterized by integrating the video signal switching part 108, the sound signal switching part 138, the PLL demodulating circuit (140, 141), the amplifying circuits and deemphasizing circuits 142 which can change over the gain and the deemphasis time constant, and the controller 150 for controlling the changeover of the switching parts (108, 138 and 142) in one semiconductor device.

The IF IC will be described below with reference to FIGS. 1 and 3.

The IF input terminal 50 in the block diagram of FIG. 1 corresponds to the input terminal 101 in FIG. 3. The IF signal is fed to the IF IC through the SAW filter 102 on the video side. The signals based on the mode switch (not shown) are supplied to two points prior to the SAW filter 102. At this point, the input signal is selected as the NTSC signal or the PAL signal. This selection points (D1, D2) correspond to the switching part 51 in FIG. 1.

The above-mentioned SAW filter 102 for the video signal are connected with the posterior stage of such switching points (D1, D2). The two output lines of the SAW filter 102 on the video side output the balance signal. Such balance signal is applied to pins 4 and 5 of the IF IC.

The sound signal is applied to pin 7 of the IF IC through the SAW filter 130 in the posterior stage of the switching parts (D1a, D2a).

The switching part on the video side will be described first.

The cathodes of the diodes D1, D2 are connected with the input terminal 101. These cathodes are connected with the reference potential point through the resistor R1 so that the DC voltage can be applied to the anodes of the diodes D1, D2.

Likewise, the cathodes of the diodes D1a, D2a are connected with the input terminal 101. These cathodes are connected with the reference potential point through the inductance L1 and the resistor R1 so that the DC voltage can be applied to the anodes of the diodes D1a, D2a.

The DC voltage is applied to the diodes D1 and D2 so that the either NTSC signal or the PAL signal can be selected. The diodes D1, D2 are changed over according to the logic signals SW1, SW2 (see FIG. 4) which is applied to the terminals 151, 152 from the mode switch circuit (not shown).

Both input terminals 151, 152 of the logic signals SW1, SW2 are respectively connected with the base of the transistor Q4 through the diodes D4, D3. Both collectors of the transistors Q4, Q5 are respectively connected with the DC power supply +B through the resistors R7, R8. The collector of the transistor Q4 is connected with the base of the transistor Q5 and with the anode of the above-mentioned diode D2 through the resistor R3. The collector of the transistor Q5 is connected with the anode of the diode D1 through the resistor R4. The resistor R3 and the capacitor C4 and the resistor R4 and the capacitor C3 of the diodes D1, D2 are used for stabilizing the voltage. Since this device has such connection configuration, as shown in FIG. 4, when both logic signals SW1, SW2 are at low level (L), D2 to which the DC voltage is applied from the DC power supply +B turns on, so the NTSC side is selected. When the level combination of the logic signals SW1, SW2 is other than the above-mentioned one, the DC voltage is applied to the diodes D1 and D1 turns on, so the PAL side is selected.

The DC cutoff capacitors C1, C2 are connected with the input side of the SAW filters 102. The diode switch (D1, D2) selects either the NTSC signal or the PAL signal, and sends it to the posterior SAW filters 102. The SAW filters 102 pass the video IF signal band only in the IF signal supplied to the input terminal 101. Therefore, either the NTSC video IF signal or the PAL video IF signal selected by the diode switch (D1, D2) is applied to pins 4 and 5 of the IF IC in balanced condition.

Similarly, the DC voltage is applied to the diodes D1a and D2a so that either NTSC signal or the PAL signal can be selected. The diodes D1a, D2a are changed over according to the logic signals SW1, SW2 (see FIG. 4) which are applied to the terminals 151, 152 from the mode switch circuit (not shown). The same DC voltage as that applied to each anode of the above-mentioned diodes D1, D2 is applied to each anode of the diodes D1a, D2a to change over the NTSC side and the PAL side. The DC cutoff capacitors C1a, C2a are connected with the input side of the SAW filter 130. The diode switch (D1a, D2a) selects either the NTSC signal or the PAL signal, and sends it to the posterior SAW filters 130. The SAW filter 130 passes the sound IF signal band only in the IF signal supplied to the input terminal 101. Therefore, either the NTSC video IF signal or the PAL video IF signal selected by the diode switch (D1a, D2a) is applied to pin 7.

The IF IC contains the amplifying circuits 103 to amplify the video signal to the sufficient amplitude. The signal amplified here is output from pin 13 of the IF IC through the multiplying circuit 104 for video-detection. The video signal from pin 13 is supplied again to pins 15, 16 of the IF IC through the sound trap circuit 106 for 4.5 MHz and the common sound trap circuit 107 for 5.5 MHz, 6.0 MHz and 6.5 MHz. Such video signal is equalized in the switching part 108 and the equalizing amplifier 109 in the IF IC. The video signal is supplied to the output terminal 145 from the equalizing amplifier 109 through the emitter follower Q1.

The present invention will be further described with reference to the correspondence between FIGS. 1 and 3.

The video signal detecting means (the multiplying circuit 57 and the oscillator 58) in FIG. 1 corresponds to the section consisting of the multiplying circuit 104, the 90-degree phase-shifting device 105, the multiplying circuit 115, the automatic phase control circuit (APC circuit) 112 and the VCO 113. The frequency of the VCO 113 is determined by the resonance circuit L2 and C14. The detection is performed based on the signal from the VCO 113. The oscillation output of the VCO 113 is fed to the video detection multiplying circuit 104 through the 90-degree phase-shifting device 105. To the multiplying circuit 115, both oscillation signal from the VCO 113 and IF signal from the amplifying circuit 103 are supplied. The difference between both signals, namely, the phase difference (the frequency difference) is output as the control voltage from APC circuit 112 including the loop filter. The oscillation of the VCO 113 is controlled by this control voltage to match the frequency and the phase of the oscillation output of the VCO 113 to the frequency of the IF signal, while keeping the phase in the constant relationship. Therefore, the oscillator 58 in FIG. 1 corresponds to the section consisting of the 90-degree phase-shifting device 105, the multiplying circuit 115, the APC circuit 112 and the VCO 113.

The sound trap and equalizing circuits (61–64) in FIG. 1 correspond to the NOTE 2 section in FIG. 3. This section consists of the filters (106A, 107A) and the coils (L3, L4) connected respectively in parallel with such filters. In FIG. 3, two parallel resonance circuits for the NTSC and the PAL systems are connected in parallel with each other for pin 13, and the output terminal of each resonance circuit is respectively connected with pins 15, 16 of the IF IC. Each resonance circuit can attenuate the predetermined frequency band (band of 4.5 MHz, and the band consisting of 5.5 MHz, 6.0 MHz and 6.5 MHz) only. In the IF IC, each output of the above-mentioned pins 15, 16 is applied to the switching part 108. The switching part 108 changes over the NTSC signal and the PAL signal. Such changeover is made by the controller 150 installed in the IF IC according to the logic signal from the mode switch circuit (not shown). (The dotted line shows the control signal of the controller 150.)

The output of the switching part 108 is sent from the output transistor Q1 to the output terminal 145 through the equalizing amplifier 109 in the IF IC and pin 18. The series resonance circuit comprising the capacitor C7, the coil L5 and the resistor R is connected with pin 17. This resonance circuit determines the equalization characteristics.

The IF AGC circuit 110 operates according to the output signal from the equaling amplifier 109. This circuit 110 feeds the AGC signal to the control terminal of the above-mentioned amplifying circuit 103. So the gain can be controlled according to the amplitude of the output signal of the equalizing amplifier 109.

The output signal of the IF AGC circuit 110 is output from the monitoring pin 8 and at the same time as the RF AGC control signal from pin 9. The AGC signal from the IF AGC circuit 110 is amplified to a signal with the sufficient amplitude in the amplifying circuit 116. The resulting signal is applied to the RF AGC circuit (not shown). Such output signal is also supplied to the lock detecting circuit 111 to detect the lock state of the AGC loop here. The APC circuit 112 operates according to the detection signal of the lock detecting circuit 111.

The output signal of the APC circuit 112 is fed to the VCO 113 as the control voltage, and at the same time to the AFT circuit 114. Such control voltage is output to pin 10 as the AFT voltage and sent to the tuner part (not shown) through the emitter follower Q3.

The power supply voltage +B (9V) is supplied to the IF IC pin 20 and the impedance conversion transistors Q1, Q2 and Q3.

The sound signal processing side will be described below.

The IF signal applied to the IF IC pin 7 is fed to the amplifying circuit 131 and amplified here to a signal with the amplitude required for processing. The gain of this amplifying circuit can be controlled. The output signal from the multiplying circuit 132 for demodulating the sound intercarrier is detected by the automatic gain control circuit (the AGC circuit) 133 and its detection signal is negatively fed back as the AGC voltage to the amplifying circuit 131 to control its gain. The oscillation signal phase-synchronized with the video IF signal from the oscillating means (corresponding to the oscillator 58 in FIG. 1) comprising the multiplying circuit 115, the APC circuit 112 and the VCO 113 is multiplied by the sound IF signal from the amplifying circuit 131 in the multiplying circuit 132. As a result, the sound intercarrier signal is demodulated as the frequency difference between both signals. The sound intercarrier signal demodulated in the multiplying circuit 132 is output through the IF IC pin 19. This signal is fed to the common input terminal of the band-pass filters 134–137 (corresponding to the band-pass filters 67–70 in FIG. 1) having respectively 4.5 MHz, 5.5 MHz, 6.0 MHz and 6.5 MHz bands through the resistor R14. Each output terminal of the band-pass filters 134–137 is respectively connected with the IF IC pins 21–24. The sound intercarrier signals with each band supplied into the IF IC through pins 21–24 is selected in the switching part 138 (corresponding to the switching part 66 in FIG. 1) according to the control signal. The sound signal is demodulated in the sound demodulating circuit (the NOTE1 circuit).

The sound demodulating circuit, NOTE1 comprises the amplitude limiting amplifier 139, the VCO 140 and the multiplying circuit 141. This circuit corresponds to the FM demodulating circuit 80 in FIG. 1. The VCO 140 forms the phase locked loop (PLL) together with the multiplying circuit 141. The VCO 140 has the wide band characteristics. The PLL FM-demodulating circuit (140, 141) can demodulate the signals according to the sound intercarrier frequency. The amplitude limiting amplifier 139 is installed in the prior stage to suppress the changing components of the sound intercarrier signal so as to demodulate the stable signal in the PLL FM-demodulating circuit (140, 141). The capacitor C9 is connected with the IF IC pin 2 to ensure the stable operation of the VCO 140.

The output of the PLL FM-demodulating circuit (140, 141) is supplied to the amplifying circuit and the deemphasizing circuit 142 of the final stage.

To supply the switching control signal to the switching part 138 in the IF IC, the logic signals SW1, SW2 from the mode switch (not shown) are repectively supplied to the sound intercarrier signal passages (pins 22, 23 in this figure) through the resistor R5 and the capacitor C5 as well as the resistor R6 and the capacitor C6. The logic signals SW1, SW2 are supplied to the controller 150 in the IF IC through pins 22, 23. The controller 150 generates the switching control signal corresponding to the combinations of the logic signals SW1, SW2 as shown in FIG. 4 (the control signals corresponding to each broadcasting system and supplies it to the swiching part 138). The switching part 138 selects the input of one of the broadcasting systems specified out of four inputs by the controller 150. The purpose of the above-mentioned resistor R5 and the capacitor C5 as well as the resistor R6 and the capacitor C6 is to stabilize the DC voltage.

The controller 150 can specify the gain and the deemphasis characteristics to the amplifying circuit and the deemphasizing circuit 142 according to the logic signals SW1, SW2 from the mode switch. The output according to each broadcasting system is obtained from the circuit 142. Such output is fed to pin 1 and can be output as the sound signal from the output terminal 146 through the emitter follower Q2.

FIG. 4 shows the setting of the mode switch. When both logic signals SW1, SW2 is at low level state, such mode corresponds to the NTSC system, and other states correspond to the PAL system. FIG. 4 shows the 4 different sound intercarrier frequencies (4.5 MHz, 5.5 MHz, 6.0 MHz and 6.5 MHz). The sound intercarrier frequency (the second sound intermediate frequency) is indicated by SIF, and the video signal equalizing characteristics by EQ in. The EQ in corresponds to the color systems. The gain and the deemphasis time constant of the amplifying circuit and the deemphasizing circuit 142 of the final stage are indicated in dB and $\mu$s unit. Each broadcasting system (M, B/G, I and D/K) is indicated corresponding to the SIF.

By configurating as above-mentioned, all the switching parts excluding that of the SAW filter of the IF signal input part can be accommodated in the IF IC as the semiconductor device. The PLL FM-demodulating circuit is employed as the sound signal demodulating circuit. The following circuits and means can be accommodated in the IF IC: the amplifying circuit to regulate the fluctuations of the sound signal to the constant level after the FM demodulation process, which are caused by the difference in the frequency modulation degree of each broadcasting system, the deemphasizing circuit for changing over the deemphasis time constant according to the different preemphasis degree of each broadcasting system, and the means for controlling the changeover of the switching parts. Therefore, the IF IC of very high integration density can be achieved, so that the number of the whole components of the IF signal processing circuit can be decreased and the number of the components around the IF IC can be minimized. With the reduction of the number of the switching parts, the wiring inside and outside the IC can be simplified. For this reason, a very reasonable multivision IF signal processing circuit has been achieved with less assembly man-day.

The present invention is not limited to the above-mentioned embodiments. Various modifications can be made without departing its scope.

What is claimed is:

1. An IF signal processing circuit for processing a video IF signal and a sound IF signal and formed in one semiconductor integrated circuit, the processing circuit being adapted to receive TV signals from a plurality of broadcasting systems and to produce as outputs, a TV video signal and a TV sound signal representative of one of the TV signals, the processing circuit comprising:

first detecting means for receiving as an input, an IF signal in a video band, and for producing as an output, a detected video signal;

video signal processing means, including a first group of frequency circuits, and first switch means for selectively coupling one frequency circuit of said first group of frequency circuits to said first detecting means to produce a video signal having frequency characteristics in accordance with a corresponding one of the broadcasting systems;

second detecting means for receiving as an input, an IF signal in a sound band and for producing as an output, a sound intercarrier signal;

sound signal processing means including a second group of frequency circuits and second switch means for selectively coupling one frequency circuit of the second group of frequency circuits to said second detecting means, to pass a sound intercarrier signal in accordance with the corresponding one of the broadcasting systems;

PLL demodulating means having a phase lock loop for receiving as an input, one selected sound intercarrier signal from said sound signal processing means, and for producing as an output, an FM-demodulated sound signal;

adjusting means for adjusting an amplitude of the sound signal produced as an output, from said PLL demodulating means in accordance with each of the broadcasting systems; and controlling means for changing over said first and second switch means and controlling said adjusting means in accordance with the corresponding broadcasting system to produce as outputs, a video signal and a sound intercarrier signal in accordance with the corresponding broadcasting system;

wherein said first and second detecting means, said PLL demodulating means, said adjusting means, said first and second switch means, and said controlling means are formed in a single semiconductor integrated circuit.

2. The IF signal processing circuit of claim 1, wherein the first group of equalizing circuits includes a plurality of sound trap circuits for removing a sound signal having an intercarrier frequency corresponding to the particular one broadcasting system, and the second group of frequency circuits includes a plurality of band-pass filters to pass the processed sound intercarrier signal having an intercarrier frequency corresponding to the particular one broadcasting system.

3. The IF signal processing circuit of claim 1, wherein the adjusting means comprises:

a plurality of amplifying circuits having gains according to each broadcasting system to obtain a constant sound signal level;

a plurality of deemphasizing circuits for deemphasizing a signal according to preemphasis given on a transmission; and third switch means equipped with a control terminal for selecting the amplifying circuits and the deemphasizing circuits according to each broadcasting system.

4. The IF signal processing circuit of claim 1, wherein the controlling means has an input terminal to which a plurality of binary signal are supplied and selectively controls the changeover of the first and second switch means according to a change in level of the plurality of binary signals, and controls amplitude of the FM-demodulated sound signal.

* * * * *